United States Patent [19]

Hölter

[11] 4,131,439
[45] Dec. 26, 1978

[54] DEVICE FOR THE DEDUSTING OF DUST-CONTAINING GASES

[76] Inventor: Heinz Hölter, Beisenstrasse 39-41, 4390 Gladbeck, Fed. Rep. of Germany

[21] Appl. No.: 798,237

[22] Filed: May 18, 1977

Related U.S. Application Data

[63] Continuation-in-part of Ser. No. 735,946, Oct. 27, 1976, abandoned.

[51] Int. Cl.$^2$ .............................................. B01D 47/10
[52] U.S. Cl. ............................. 55/220; 261/DIG. 54
[58] Field of Search ................. 55/220, 226, DIG. 25; 261/19, 78 A, DIG. 54

[56] References Cited

U.S. PATENT DOCUMENTS

| 2,852,239 | 9/1958 | Vicard | 261/DIG. 54 |
| 2,883,167 | 4/1959 | Krantz | 261/78 A |
| 2,961,050 | 11/1960 | MacCracken | 261/DIG. 54 |
| 3,386,712 | 6/1968 | Pafla | 261/DIG. 54 |
| 3,517,485 | 6/1970 | Dell'Agnese et al. | 55/226 |

FOREIGN PATENT DOCUMENTS

| 2448249 | 4/1976 | Fed. Rep. of Germany | 261/DIG. 54 |
| 2458821 | 6/1976 | Fed. Rep. of Germany | 261/DIG. 54 |
| 571843 | 1/1958 | Italy | 55/220 |
| 579046 | 7/1958 | Italy | 261/DIG. 54 |

Primary Examiner—Frank W. Lutter
Assistant Examiner—David L. Lacey
Attorney, Agent, or Firm—Berman, Aisenberg & Platt

[57] ABSTRACT

A device for dedusting dust-containing gases to which have been supplied a liquid in a finely-distributed form. The device is characterized by a tubular structure having at least one venturi-like constriction for receiving the dust-containing particles. The constriction is characterized by the provision of a converging section having a reduced cross-sectional dimension which generates crossing paths of the fluid and dust particles which extend beyond the narrowest cross-sectional position of the constriction. Further downstream is positioned a diverging section to which is adjoined at least one other converging section. The last-named converging section also has a cross-section which reduces more than linearly in the direction of particle flow. A final diverging section adjoins the last-named converging section, between which is formed a tear-off edge for creating further turbulent mixing of the particles.

1 Claim, 1 Drawing Figure

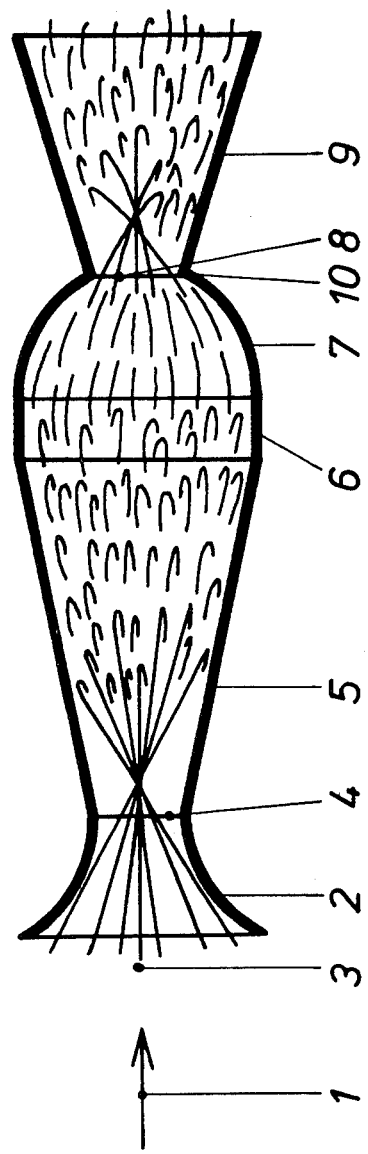

DEVICE FOR THE DEDUSTING OF DUST-CONTAINING GASES

RELATED APPLICATION

This application is a continuation-in-part of copending application Ser. No. 735,946, filed on October 27, 1976, now abandoned.

BACKGROUND OF THE INVENTION

FIELD OF THE INVENTION

This invention relates to a device for dedusting dust-containing gases to which has been supplied a liquid in a finely-distrubuted form. The gases and liquid are subsequently conducted through a tubular segment with at least one venturi-like constriction.

DESCRIPTION OF THE PRIOR ART

Known devices use a pressure drop, which develops in a venturi-like constriction, to agglomerate liquid and gas-borne dust particles which are thus separated from the gas. Several such venturi-like constrictions, one after the other, in the direction of flow, are optionally provided to improve agglomeration and thus the efficiency of such device.

The devices operate with a relatively small energy loss. This is due to the fact that, during passage through the venturi-like constriction, the flow or current is disturbed only to a minor extent or not at all. For example, a laminar current will be preserved during passage through a venturi-like constriction. The individual flow lines of the current are of course likewise constricted, but they do not intersect or cross each other.

The paths of the liquid and dust particles of a dust-containing gas act similarly during passage through a venturi-like constriction. That is, the positions of certain specific liquid or dust particles on various cross-sectional surfaces of the constriction are congruent with respect to each other. Further, the marginal zones, as well as the middle zones, in every cross-section are always permeated by the same flow-line paths.

As a result, optimum agglomeration of fluid and dust particles cannot be achieved because, in essence, the particles are transported next to each other in a gas current.

Proportions of the various sections of a venturi, particularly when the latter approximates the form established by its inventor, Clemens Herschel, are rather closely defined. The inlet is a short cylindrical section having a length a, a circular cross-section and a diameter which is that of the pipe to which it is attached. This is followed by an entrance cone having an included angle $a_1$ and leading (by an easy tangential curve) into a short throat section having a length b and a diameter d. A long diverging cone, having an included angle $a_2$, expands the fluid to the full pipe diameter. The throat diameter ranges from one-third to three-fourths of the pipe diameter.

According to "McGraw-Hill Encyclopedia of Science and Technology", Third Edition, Volume 14, pp 346 and 347, McGraw-Hill, Inc., 1971, a Herschel-type venturi tube has the following proportions:

D = pipe diameter, inlet and outlet
d = throat diameter
a = inlet length =
  0.25D to 0.75 D for $4'' \leq D \leq 6''$
  0.25D to 0.5 D for $6'' < D \leq 32''$
b = d
$r_1$ = the interior radius of curvature between the inlet cylindrical section and the entrance cone = 0 to 1.375D
$r_2$ = the exterior radius of curvature between the entrance cone and the throat = 3.5d to 3.75d
$a_1$ = the included angle of the entrance cone = 21° ± 2°
$a_2$ = the included angle of the diverging cone = 5° to 15°.

Marks' "Mechanical Engineers Handbook", sixth edition, page 3-66, McGraw-Hill Book Company, Inc., 1958, indicates that the throat diameter of a venturi is usually some size between 0.25 and 0.75 of the upstream diameter, depending on flow rate and line pressure, that the upstream convergence angle may be from 25° to 30°, but the downstream divergence angle should not be greater than 7.5°.

The principal advantage of the venturi tube is stated to be that not more than 10 to 20 percent of the difference in pressure between the inlet and the throat is permanently lost. This is accomplished by the discharge cone gradually decelerating the flow with minimum turbulence.

SUMMARY OF THE INVENTION

It is a primary object of the present invention to improve the contact between fluid and dust particles and thereby increase the degree of separation thereof in a gas dedusting device.

The foregoing and other objects are obtained in accordance with one aspect of the present invention through the provision of a device for dedusting dust-containing gases to which have been supplied a liquid in a finely-distributed form. The device comprises tubular (i.e. having a circular cross section) means having at least one venturi-like constriction for receiving dust-containing gaseous and liquid particles. The constriction, unlike that of a venturi, includes means for causing paths of the dust-containing gaseous and liquid particles to intersect one another. More particularly, the particle intersecting means comprises a first converging section having a decreasing cross-sectional dimension which decreases at most, and preferably less than, linearly in the direction of particle flow, the first converging section terminating at a position of narrowest cross-section downstream of which paths of the particles intersect. More particularly, the device contemplates the provision of a first diverging section extending beyond the position of narrowest cross section, and a second converging section positioned downstream of the first diverging section. The second converging section is characterized by a cross-sectional dimension which decreases more than linearly in the direction of particle flow.

In accordance with yet other aspects of the present invention, a second diverging section is adjoined downstream to the second converging section, the juncture therebetween being fairly sharp and including means for promoting contact between the liquid and dust particles, which means comprises a tear-off edge for developing turbulence of the particles.

The cross-sectional reduction of the first converging section to a constriction generates mutually intersecting paths of fluid and dust particles beyond the narrowest cross-section of the constriction, at least one additional converging section adjoining the first diverging section which follows the narrowest cross-section.

In the device according to the present invention, converging and diverging sections alternate with each other whereby the converging sections present a cross-sectional reduction such that the fluid and dust particles, after passing the narrowest section, will not be directly transported along diverging flow lines but, instead, will move along paths which cross or intersect each other. As a result, mutual contact between and deposition of fluid and dust particles are considerably promoted to achieve a particularly high degree of compaction of particles, whereby there simultaneously occurs an exchange of gas between marginal zones and middle zones of the cross-section. The results are improved when several converging and diverging sections, having the preferred shape, follow one another.

The described effect is achieved under all circumstances when the cross-section of the converging section decreases more than linearly in the direction of particle flow.

The cross-sectional change at the transition from a converging to a diverging section can be designed in a discontinuous fashion to form a tear-off edge. Turbulence, which promotes exchange of and contact between fluid and dust particles, is thereby created in the diverging section downstream of the transition.

DETAILED DESCRIPTION OF THE PREFERRED EMBODIMENT

Various objects, features and attendant advantages of the present invention are more fully appreciated as the same become better understood from the following detailed description thereof when considered in connection with the accompanying drawing, in which the sole FIGURE is a cross-sectional view of a preferred embodiment of a dedusting device according to the present invention.

The illustrated device is used for dedusting dust-containing gases which are supplied thereto along the direction indicated by an arrow 1 by a pipeline (not illustrated) having an internal diameter, e.g., substantially that of the inlet to the device. Liquid is supplied in a finely-distributed form to the dust-containing gas in the pipeline. This is effected by one or several water-spray nozzles which can be suitably positioned at, e.g., 1 and directed in the direction indicated by the arrow. Such nozzles inject finely-divided water particles into, e.g., a dust-laden air stream.

The preferred embodiment consists of a section 2 which adjoins the pipeline and which converges in the direction of flow, thereby having a decreasing cross-section. The cross-section of converging section 2 decreases to such a degree in the direction of flow that the paths 3 of fluid and dust particles carried along by the gas current will cross or intersect each other shortly downstream of the narrowest cross-section 4 of section 2, as schematically shown in the drawing. This creates turbulence and intensive contacting between the liquid and dust particles in a diverging section 5 adjoining converging section 2. The turbulence and intensive contact results from changing the relative position of particles in the current; particles which were, for example, transported in the preconnected pipeline and in converging section 2 in marginal zones have been shifted so that they are now further transported in the middle zone of the gas current, and vice versa.

Adjoining the diverging section 5 is a short substantially-cylindrical stabilizing section 6, which is followed by another converging section 7, whose cross-section in the direction of flow decreases even more rapidly than the cross-section of the converging section 2. In the example illustrated, the cross-section of the converging section 7 decreases more than linearly.

In section 5 air flows with turbulence, and water particles contained in the air cannot change their direction as quickly as the air does. This is the reason for an extremely thorough intermixing of a) air and microfine dust particles flowing with the air with b) water particles. This takes place particularly after 4 and after 8,10. In diverging sections 5 and 9 (which follow 4 and 8, 10, respectively) the angles that longitudinal cross-sections of the diverging sections makes with the axis of the device are great enough to avoid laminar flow of the air in at least boundary layers (next to inner walls of the diverging sections), to cause separation of the air from the inner wall, and to effect turbulence in at least the boundary layers.

The end of the converging section 7 terminates in a point (in a cross section shown in the drawing) of narrowest cross-section 8, which is followed by another diverging section 9. After the transition between the converging section 7 and the diverging section 9, the cross-sectional change of the flow channel is unstable so that, in the region of the point of narrowest cross-section 8, a tear-off edge or sharp (line) intersection 10 is formed, after which turbulence develops. This turbulence also promotes contact between the liquid (water) and dust particles and thus improves the final degree of separation of dust from the gas current.

Dust-laden water is separated from air in the gas stream or current downstream of the device depicted in the drawing. Such separation is effected according to well-established procedures with known apparatus designed for that purpose.

From the preceding description it is appreciated that converging sections 2 and 7 and intersection 10 effect collision between dust and liquid particles. Such collision primarily occurs in the subsequent diverging sections in the previously-noted manner. Whereas a venturi is designed to minimize turbulence, the subject device is designed to create turbulence, which is preferably fairly intense. This turbulence primarily occurs in the diverging sections immediately following the converging structure which brings it about. The exhaustive research that has been done with regard to designing venturis to reduce or eliminate turbulence has taught all artisans the limits, angles and design factors which create turbulence. The accompanying drawing and such knowledge will enable any artisan to construct a device according to this invention.

One such device has an inlet diameter, $d_i$, of 190 millimeters (mm) [the same as that of a concentric pipeline to which the inlet is directly connected and through which 60 cubic meters per minute ($m^3$/min.) of dust-laden air are transmitted], a diameter, $d_4$, at throat 4 of 125 mm, a diameter, $d_6$, at stabilizing section 6 of 168 mm, a diameter, $d_{10}$, at cross-section 8 of 125 mm and an outlet diameter, $d_o$, of 200 mm; measured along its axis, the length, $l_2$, of converging section 2 is 43 mm, the length, $l_5$, of diverging section 5 is 155 mm, the length, $l_6$, of stabilizing section 6 is 25 mm, the length, $l_7$, of converging section 7 is 55 mm, the length, $l_9$, of diverging section 9 is 282 mm and the overall length, $l_o$, is 560 mm; the radius, $r_2$, of the exterior arc of converging section 2 is 55 mm and the radius, $r_7$, of the interior arc of converging section 7 is 84 mm; and each of the angles, $\alpha_5$ (the angle that a longitudinal cross section of diverging section 5 makes with the axis of the device) and $\alpha_9$ (the angle that a longtudinal cross section of diverging section 9 makes with the axis of the device), is 7°. The noted dimensions are merely exemplary. Although $d_4$ should not be greater than $d_{10}$, the two may otherwise independently vary (for a device having the same inlet and outlet diameters) from, e.g., 50 to 170 mm; having the larger diameter for $d_4$ results in inferior dedusting, whereas the smaller diameter results in a severe pressure loss. Likewise, $r_2$ can actually vary from 0 (for a disc perpendicular to the axis) to $\infty$ (for a conical converging section 2); the depicted less-than-linear cross-sectional decrease in the flow direction is preferred. Diverging angle, $\alpha_5$, is virtually any angle up to 20°; a larger angle might result in interrupted lamination, which is undesirable. Diverging angle, $\alpha_9$, is virtually any angle up to 25°. Throat section 4 optionally has any length up to 190 mm for a device having the same inlet and outlet diameters.

In the actual example the depicted device may be used for dedusting more than 60 m³/min. of dust-laden air, but such will result in a pressure loss which may be uneconomically high.

Obviously, numerous modifications and variations of the present invention are possible in light of the above teachings. It is therefore to be understood that, within the scope of the appended claims, the invention may be practiced otherwise than as specifically described herein.

What is claimed is:

1. A tubular device for dedusting dust-containing gases in which liquid in finely-distributed form has been incorporated, the device having a) an upstream inlet end, b) a downstream outlet end, c) at least one venturi-like constriction means therebetween for receiving dust-containing gaseous and liquid particles and for causing paths of the dust-containing gaseous and liquid particles to intersect one another when said dust-containing gaseous and liquid particles are concurrently passed into said device through the upstream inlet end and past the constriction means from an upstream position; said constriction means comprising a first converging section having a decreasing cross-sectional dimension terminating at a position of narrowest cross-section, the paths of said particles intersecting downstream of the position of narrowest cross-section, and d) a first diverging section extending downstream of the position of narrowest cross-section; e) a second converging section positioned downstream of the first diverging section, the second converging section having a cross-sectional dimension which decreases more than linearly in the direction of the downstream outlet end; and f) a second diverging section adjoined downstream of said second converging section, the second diverging section and said second converging section joining at a junction which includes means for promoting contact between liquid and dust particles in a gas stream passed therethrough, the contact-promoting means comprising tear-off edge means for developing turbulence.

* * * * *